Jan. 22, 1957 R. P. ATKINSON 2,778,565
TURBINE AND COMPRESSOR COUPLING
Filed May 9, 1952 2 Sheets-Sheet 2

Inventor
Robert P. Atkinson
By Willits, Helmig & Baillio
Attorneys

United States Patent Office 2,778,565
Patented Jan. 22, 1957

2,778,565
TURBINE AND COMPRESSOR COUPLING

Robert P. Atkinson, Indianapolis, Ind., assignor to General Motors Corporation, Detroit, Mich., a corporation of Delaware Application May 9, 1952, Serial No. 287,065

6 Claims. (Cl. 230—116)

This invention relates to a gas turbine, and more particularly to a coupling shaft arrangement for connecting the turbine and compressor.

Gas turbine engines, especially of the axial flow type, are subject to relative expansion between their turbines and compressors due to the varying thermal conditions through the engine, and it has been a common practice to connect the turbine with the compressor by an intermediate shaft which, in some installations, is of considerable length. In the usual construction, this intermediate shaft is splined at both ends to engage splines on the turbine and compressor shafts. Since it is impossible to attain highly accurate radial location of the intermediate shaft by a splined connection, and because of the high speed of rotation of the gas turbine engine, difficulty has been encountered in eliminating vibration of the intermediate shaft due to its inaccurate radial location.

It is an object of this invention to provide a coupling between a turbine and a compressor which will exhibit a minimum of vibration at high rotational speeds and which will run true relative to its own axis.

Another object of this invention is to provide a gas turbine assembly wherein a compressor rotor and a turbine rotor are coaxially aligned in spaced relationship with bearing supported end portions facing each other, with an intermediate torsion shaft spherically piloted to the end portions, and with coupling members splined to the ends of the torsion shaft and to the end portions of the rotors.

Further objects and advantages of the present invention will be apparent from the following description, reference being had to the accompanying drawings wherein a preferred form of the present invention is clearly shown.

Figure 1:
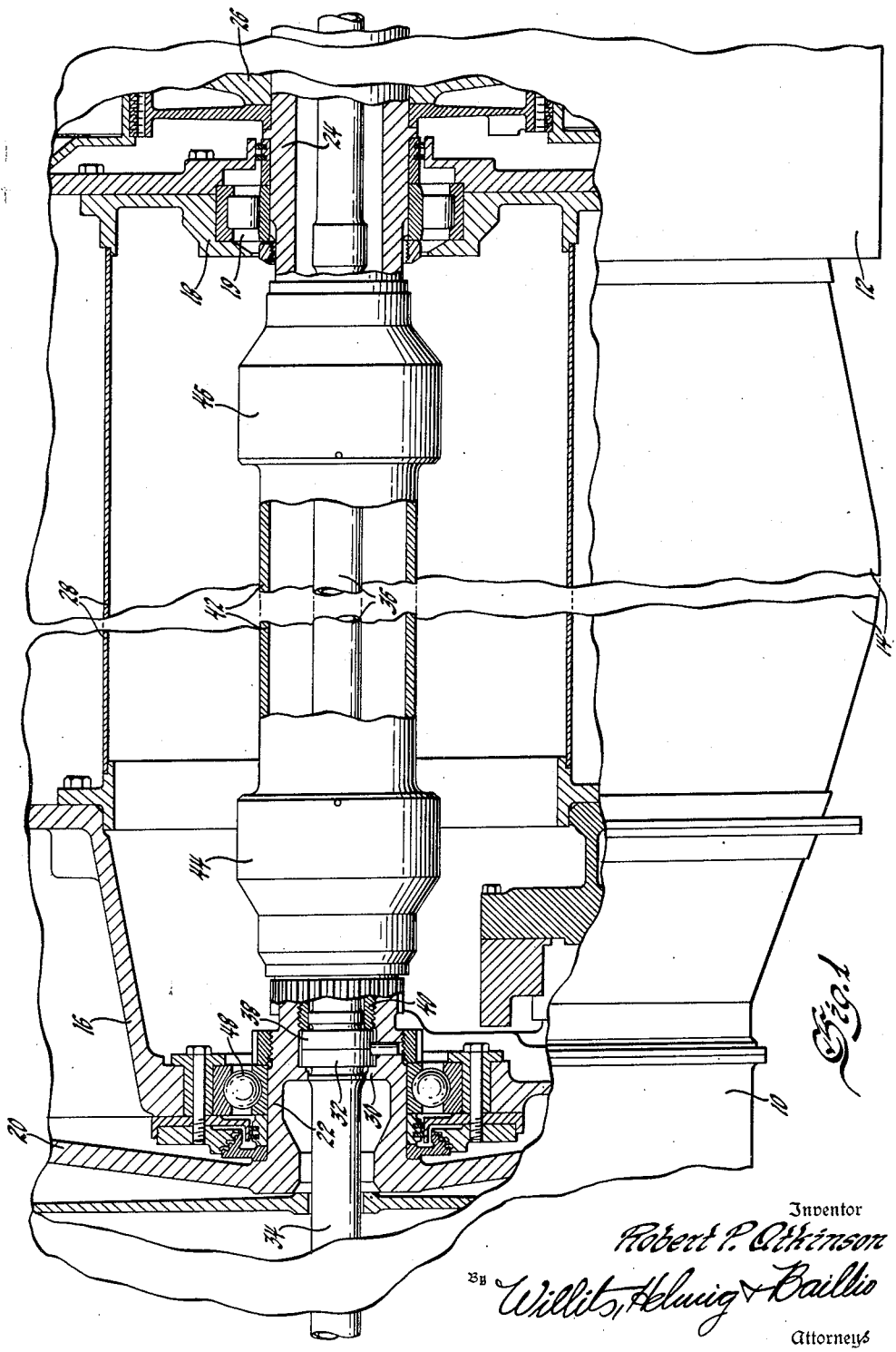
Figure 1 is a fragmentary view, taken partially in section, of the central portion of a gas turbine engine of known type illustrating my improved coupling.

Referring now to the drawings in detail and more particularly to Figure 1, it should be noted that my invention is applied in this instance to an axial flow gas turbine engine of conventional design such as is generally understood to include an axial flow compressor that supplies air to an annular combustion apparatus to which fuel is supplied so that the combustion products which issue from the combustion apparatus may be utilized to drive an axial flow turbine.

In Figure 1, only the central portion of such a turbine engine is illustrated, namely the portion extending from the aft section of the compressor to the forward section of the turbine. In the particular installation, a drum type compressor and a semi-drum type turbine are utilized. The aft portion of the compressor shell is indicated by the numeral 10, while the forward portion of the turbine shell is indicated by the numeral 12, and the combustion chamber shell is indicated by the numeral 14. The numeral 16 indicates the aft bearing support for the compressor while the numeral 18 indicates the forward bearing support for the turbine bearing 19; and it should be understood that the forward portion of the compressor and the aft portion of the turbine are provided with similar bearing supports (not shown). The end disk 20 of the compressor rotor is integral with the aft compressor shaft portion 22. The turbine disks are supported on the turbine shaft 24 and the first stage turbine disk is indicated by the numeral 26. An inner shell 28 separates the centrally located coupling section of the engine from the combustion chambers. The aft compressor shaft portion 22 is provided with a flange 30 which engages a shoulder 32 on the tension shaft or tie bolt 34. The tie bolt 34 is provided at its forward end (not shown) with a nut to retain the drum type compressor rotor in assembled relation in the usual fashion. A similar tie bolt or tension shaft 36 for the turbine is likewise provided with a shoulder 38 which is engaged by the threaded sleeve 40. The aft end (not shown) of the tie bolt or tension shaft 36 is provided with a nut engaging the aft end of the turbine shaft in the usual fashion. A hollow torsion shaft 42 interconnects the turbine shaft 24 and the compressor shaft 22 by means of internally splined sleeves 44 and 46. In operation, the compressor and turbine will impose axial thrusts acting in opposite directions upon the engine and these thrusts will be carried by the tie bolts 34 and 36 to the aft compressor shaft portion 22, at which point the thrusts will partially cancel each other out and any remaining thrust will be transferred to the thrust bearing 48. Thus the tie bolts 34 and 36 transmit the axial loading of the engine, the torque of the engine being transmitted from the turbine to the compressor through the torsion shaft 42 and the sleeves 44 and 46.

Figure 2:
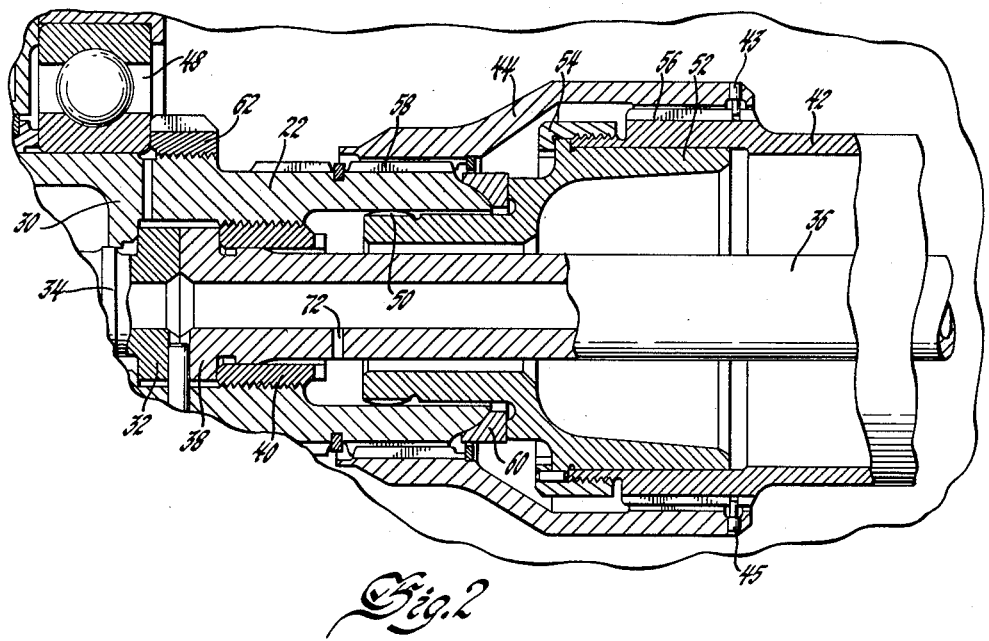
Figures 2 and 3 are enlarged views, taken partially in section, of the end portions of the coupling illustrated in Figure 1.

Referring now to Figure 2 for an enlarged section of the forward portion of the coupling between the turbine and the compressor, the hollow torsion shaft 42 is piloted in a cylindrical inner portion of the shaft 22 by a spherical surface 50 that is axially grooved for lubricant passage and that is formed on an end plug 52 which is secured to the torsion shaft 42 by a threaded sleeve 54. The center of the spherical surface 50 lies on the common axis of the shaft 22 and the hollow torsion shaft 42 and it can thus be seen that the spherical surface 50 will insure axial alignment of the forward end of the shaft 42 with the shaft 22. The coupling sleeve 44 is located by the pins 43 and 45 and is internally splined at 56 to the torsion shaft 42 and at 58 to the shaft 22 whereby torque may be transmitted. The sleeve 44 is radially floatable; i. e., it will be accommodate axial and angular displacement of the shaft 42 relative to the shaft 22, because of the splined connections 56 and 58. A ring 60 lies between the plug 52 and the shaft 22 and functions as an intermediate thrust member during the initial tensioning of the tie bolt 36, but is not essential to the invention. A threaded sleeve 62 is utilized to locate the shaft 22 with respect to the thrust bearing 48.

Figure 3:
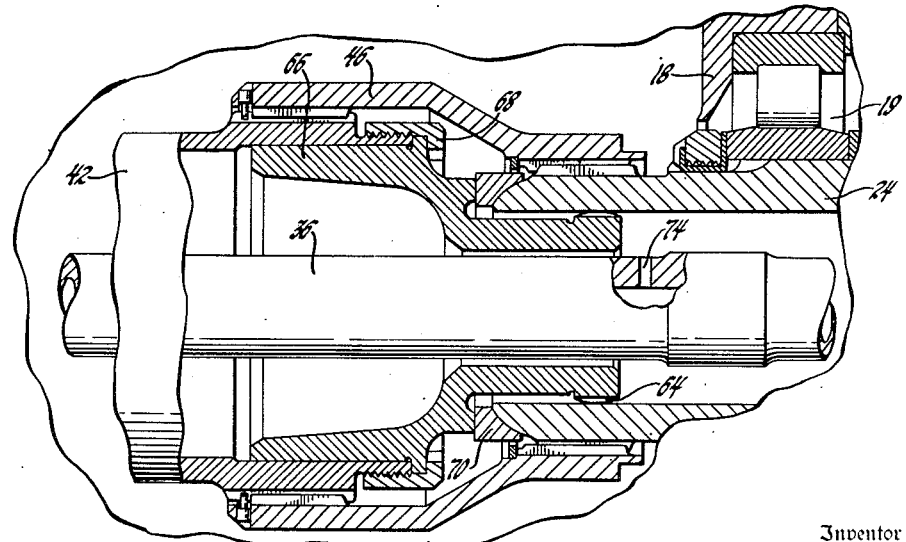

Figure 3 illustrates the rearward portion of the coupling between the compressor and turbine. This connection is generally similar to that illustrated by Figure 2. The torsion shaft 42 is connected to the turbine shaft 24 by the internally splined sleeve 46 and is piloted in the hollow cylindrical end of the shaft 24 by a spherical surface 64 of the end plug 66 which is secured to the shaft 42 by a threaded sleeve 68. A ring 70 is also provided which functions after the fashion of the ring 60 previously described.

It might also be pointed out that the interior of the tie bolts 34 and 36 are utilized as a lubrication conduit for the lubrication system described and claimed in application Serial No. 159,792, filed May 3, 1950 now Patent No. 2,693,248. Lubricant is led from the interior of the tie bolt 36 through the bores 72 and 74 so that the spherical pilots 50 and 64 will be lubricated.

For an understanding of my invention, it is first necessary to visualize the causes of vibration in previous compressor-turbine couplings. Although the turbine and compressor are installed in such a manner as to be in initial axial alignment, the mounting of the gas turbine engine in an aircraft, and the strains imposed by various flight maneuvers are such as to impart a slight amount of axial misalignment between the turbine and compressor that is difficult to eliminate in view of the limitations against increases in the weight of aircraft powerplants. In prior constructions, the torsion shaft 42 was directly splined at its ends to the compressor and turbine and, recognizing the self-centering effect of a splined coupling, it can readily be seen that a slight misalignment of the compressor and turbine would cause an undue amount of vibration in the torsion shaft. In addition to the vibration due to misalignment, the torsion shafts of the prior constructions were subject to vibration due to their being directly splined to the compressor and turbine as spline connections are inherently difficult to balance. By providing a spherical pilot and sleeve at each end of the torsion shaft, a slight misalignment of the compressor and turbine is possible without causing vibration of the torsion shaft, and any vibration of the sleeves 44 and 46 will be of a minor nature due to their relatively small size. The torsion shaft 42 is of considerable length and is balanced separately from the sleeves 44 and 46 about the axis of the pilots 50 and 64 so that a precise balance of the shaft 42 may be achieved.

While the form of embodiment of my invention as herein disclosed constitutes a preferred form, it is to be understood that other forms may be adopted as may come within the scope of the invention which follows.

I claim:

1. A gas turbine assembly comprising a compressor rotor and a turbine rotor coaxially aligned in spaced relationship, each rotor having a bearing supported end portion facing the other rotor, said rotors being subject to slight axial misalignment during turbine operation, and means for transmitting power between said rotors while accommodating for said misalignment comprising a torsion shaft having a spherically piloted connection at one end with said turbine rotor end portion and having a spherically piloted connection at the other end with said compressor rotor end portion and a pair of radially floatable coupling members each connecting a respective end of said torsion shaft with a respective rotor end portion.

2. A gas turbine assembly comprising a compressor rotor and a turbine rotor coaxially aligned in spaced relationship, each rotor having a bearing supported hollow end portion facing the other rotor, said rotors being subject to slight axial misalignment during turbine operation, and means for transmitting power between said rotors while accommodating for said misalignment comprising a torsion shaft having a spherical surface at each of its ends, each spherical surface being piloted in a respective rotor end portion, and a pair of radially floatable coupling members each connecting a respective end of said torsion shaft with a respective rotor end portion.

3. A gas turbine assembly comprising a compressor rotor and a turbine rotor coaxially aligned in spaced relationship, each rotor having a bearing supported hollow end portion facing the other rotor, said rotors being subject to slight axial misalignment during turbine operation, and means for transmitting power between said rotors while accommodating for said misalignment comprising a tubular torsion shaft having a spherical surface at each of its ends, each spherical surface being piloted in a respective rotor end portion, and a pair of radially floatable coupling members each splined to a respective end of said torsion shaft and to a respective rotor end portion.

4. A gas turbine assembly comprising a compressor rotor and a turbine rotor coaxially aligned in spaced relationship, each rotor having a bearing supported hollow end portion facing the other rotor, said rotors being subject to slight axial misalignment during turbine operation, and means for transmitting power between said rotors while accommodating for said misalignment comprising a tubular torsion shaft having a spherical surface at each of its ends, each spherical surface being piloted in a respective rotor end portion, a pair of radially floatable coupling sleeves each internally splined to a respective end of said torsion shaft and to a respective rotor end portion, and a tension shaft disposed within said torsion shaft and connecting said rotors.

5. A machine comprising, in combination, a driving shaft, a driven shaft substantially coaxial therewith and spaced therefrom, a torsion member for transmitting torque between said shafts, and a pair of coupling means connecting the ends of said torsion member to said shafts that will accommodate for axial misalignment of said shafts, each of said coupling means comprising closely engaged cylindrical and spherical surfaces on said torsion member and a respective shaft and a radially floatable torque-transmitting coupling sleeve splined to said torsion member and the respective shaft.

6. A machine comprising, in combination, a driving shaft, a driven shaft substantially coaxial therewith and spaced therefrom, a torsion member extending between said shafts for transmitting torque between said shafts, a pair of universal joint means each connecting a respective end of said torsion member with a respective one of said shafts to locate said torsion member in accordance with the position of said shafts, and a pair of radially floatable torsion couplings each connecting a respective end of said torsion member with a respective one of said shafts, said torsion couplings accommodating for angular displacement of said torsion member and said shafts.

References Cited in the file of this patent

UNITED STATES PATENTS

| | | |
|---|---|---|
| 477,625 | Detrick | June 21, 1892 |
| 1,871,227 | Smith et al. | Aug. 9, 1932 |
| 2,028,500 | Cook et al. | Jan. 21, 1936 |
| 2,380,113 | Kuhns | July 10, 1945 |
| 2,525,695 | Lombard | Oct. 10, 1950 |
| 2,550,580 | McLeod et al. | Apr. 24, 1951 |
| 2,625,790 | Petrie | Jan. 20, 1953 |
| 2,650,753 | Howard et al. | Sept. 1, 1953 |
| 2,655,014 | Walker | Oct. 13, 1953 |
| 2,712,740 | Boyd | July 12, 1955 |

FOREIGN PATENTS

| | | |
|---|---|---|
| 354,667 | Germany | 1922 |
| 658,778 | Great Britain | Oct. 10, 1951 |